US012659141B2

(12) United States Patent
Yeo et al.

(10) Patent No.: US 12,659,141 B2
(45) Date of Patent: Jun. 16, 2026

(54) VERIFIABLE POLYNOMIAL FUNCTION SECRET SHARING

(71) Applicant: Seagate Technology LLC, Fremont, CA (US)

(72) Inventors: Foo Yee Yeo, Singapore (SG); Nolan Ashvin Miranda, Winston-Salem, NC (US); Hannah Elizabeth Davis, Shakopee, MN (US); Jason Hwei Ming Ying, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 115 days.

(21) Appl. No.: 18/824,751

(22) Filed: Sep. 4, 2024

(65) Prior Publication Data

US 2026/0067070 A1 Mar. 5, 2026

(51) Int. Cl.

| | |
|---|---|
| ***H04L 29/06*** | (2006.01) |
| ***H04L 9/08*** | (2006.01) |
| ***H04L 9/30*** | (2006.01) |
| ***H04L 9/32*** | (2006.01) |

(52) U.S. Cl.

CPC ............ *H04L 9/085* (2013.01); *H04L 9/3026* (2013.01); *H04L 9/3247* (2013.01)

(58) Field of Classification Search

None

See application file for complete search history.

(56) References Cited

U.S. PATENT DOCUMENTS

| | | | | |
|---|---|---|---|---|
| 5,708,714 | A | 1/1998 | Lopez et al. | |
| 6,804,805 | B2 * | 10/2004 | Rub | H03M 13/2903 714/752 |
| 7,502,467 | B2 | 3/2009 | Brainard et al. | |
| 7,747,865 | B2 | 6/2010 | Krawczyk | |
| 8,983,075 | B2 | 3/2015 | D'Souza | |
| 9,485,092 | B2 | 11/2016 | Smets et al. | |
| 9,813,243 | B1 | 11/2017 | Triandopoulos et al. | |

(Continued)

OTHER PUBLICATIONS

Boyle, Elette , et al., "Function Secret Sharing", International Association for Cryptologic Research: Eurocrypt 2015, Part II, LNCS 9057, 2015, 337-367.

(Continued)

*Primary Examiner* — Andrew J Steinle

(74) *Attorney, Agent, or Firm* — HOLZER PATEL DRENNAN

(57) ABSTRACT

A dealer receives a first addend function and a second addend function. A function client provides first validation parameters, each first validation parameter corresponding to a coefficient of the first addend function and a corresponding coefficient of the second addend function. The sum of the first addend function and the second addend function equals the polynomial function. The dealer generates a function share for each share party based on a sampling of first random polynomials and second random polynomials and generates second validation parameters for each share party based on the function shares. The dealer transmits the second validation parameters to the share parties and transmits each function share to a corresponding share party. Each function share is verifiable by the corresponding share party based on the second validation parameters and a signed concatenation of the first validation parameters.

20 Claims, 9 Drawing Sheets

(56) References Cited

U.S. PATENT DOCUMENTS

| | | | | |
|---|---|---|---|---|
| 10,326,590 | B2 | 6/2019 | Smith et al. | |
| 10,950,144 | B2 | 3/2021 | Ikarashi | |
| 11,323,251 | B2 | 5/2022 | Fries et al. | |
| 11,354,199 | B2 | 6/2022 | Basu et al. | |
| 11,695,549 | B2 | 7/2023 | Damiano et al. | |
| 2014/0173270 | A1 * | 6/2014 | Matsuo | H04L 63/0428 713/150 |
| 2021/0028939 | A1 * | 1/2021 | Trevethan | G06Q 20/38215 |

OTHER PUBLICATIONS

Boyle, Elette , et al., "Function Secret Sharing: Improvements and Extensions", CCS '16: Proceedings of the 2016 ACM SIGSAC Conference on Computer Communications Security, Oct. 2016, 1292-1303.

Boyle, Elette , et al., "Secure computation with preprocessing via function secret sharing", TCC, 2019, 341-371.

De Castro, Leo , et al., "Lightweight, maliciously secure verifiable function secret sharing", Annual International Conference on the Theory and Applications of Cryptographic Techniques; Springer International Publishing., 2022, 150-179.

Koshiba, Takeshi , "Fourier-based Function Secret Sharing with General Access Structure", arXiv:1712.00735, Dec. 3, 2017.

Koshiba, Takeshi , "Fourier-based verifiable function secret sharing", 2020 International Symposium on Information Theory and Its Applications (ISITA). IEEE, 2020, 442-446.

Kruglik, Stanislav , et al., "Verifiable information-theoretic function secret sharing", IACR Cryptology ePrint Archive, Paper 2024/453; https://eprint.iacr.org/2024/453, 2024.

Luo, J. , "Efficient Threshold Function Secret Sharing With Information—Theoretic Security", IEEE Access, vol. 8, Jan. 3, 2020, 6523-6532.

Miranda, Nolan , et al., "Function-private conditional disclosure of secrets and multi-evaluation threshold distributed point functions", Cryptology and Network Security: 20th International Conference, CANS 2021; Springer International Publishing., 2021, 334-354.

Shamir, Adi , "How to share a secret", Communications of the ACM, vol. 22, Issue 11, Nov. 1979, 612-613.

Wang, Frank , et al., "Splinter: Practical Private Queries on Public Data", 14th {Usenix} Symposium on Networked Systems Design and Implementation, 2017.

* cited by examiner

Receive a first addend function and a second addend function
402

Generates a function share for each share party based on a sampling of first random polynomials and second random polynomials
404

Generate second validation parameters for each share party based on the function shares
406

Transmit the second validation parameters to the share parties
408

Transmit each function share to a corresponding share party
410

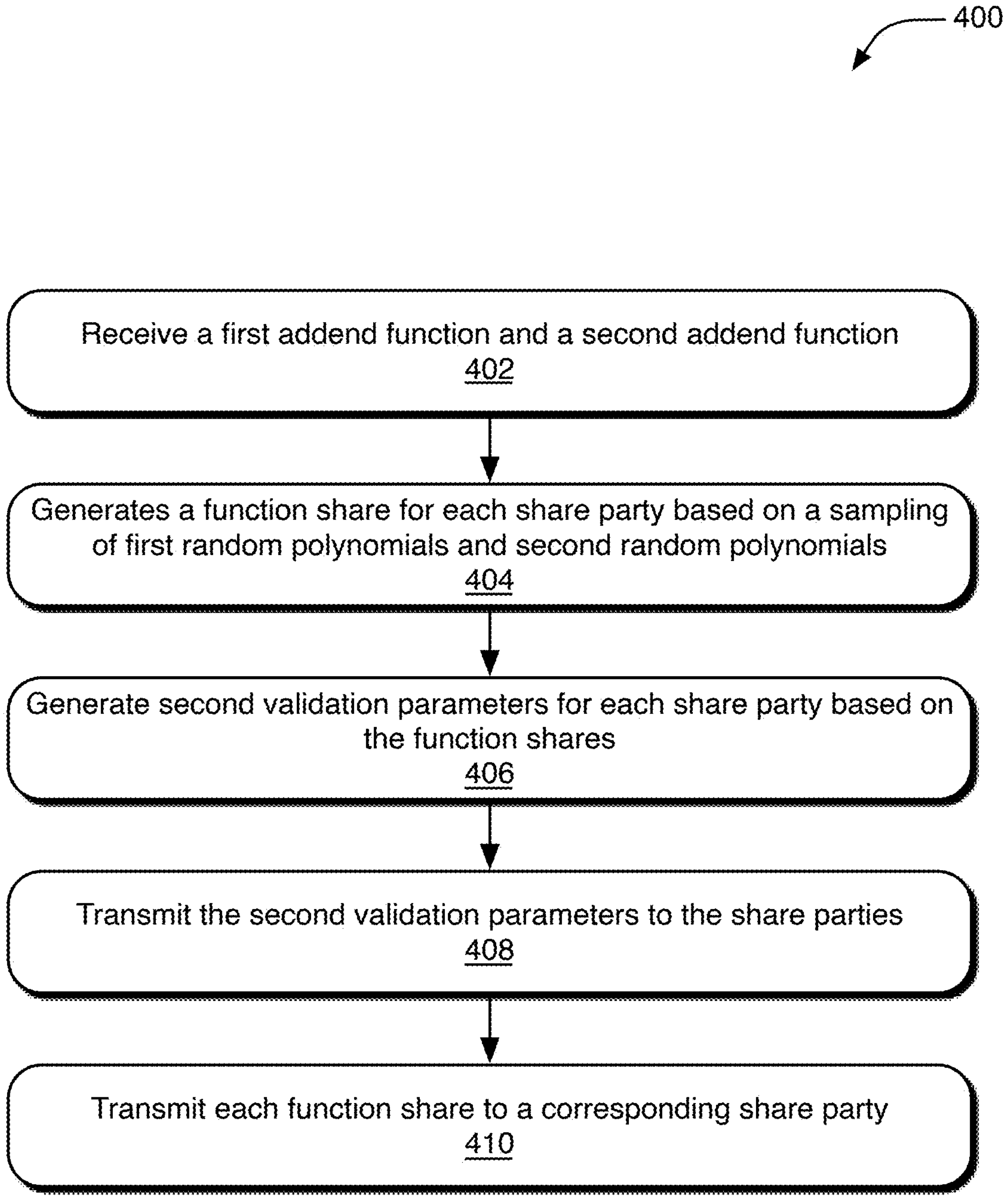

FIG. 4

Receive a validation package from a dealer and input data y from an input client
802

Receive function share results from a threshold t number of share parties
804

Compute EvalVer() to verify whether the received function share is valid for the original polynomial function provided by the function client
806

Y          Verified?          N
808

Generate and pass a function share result
810

Terminate
812

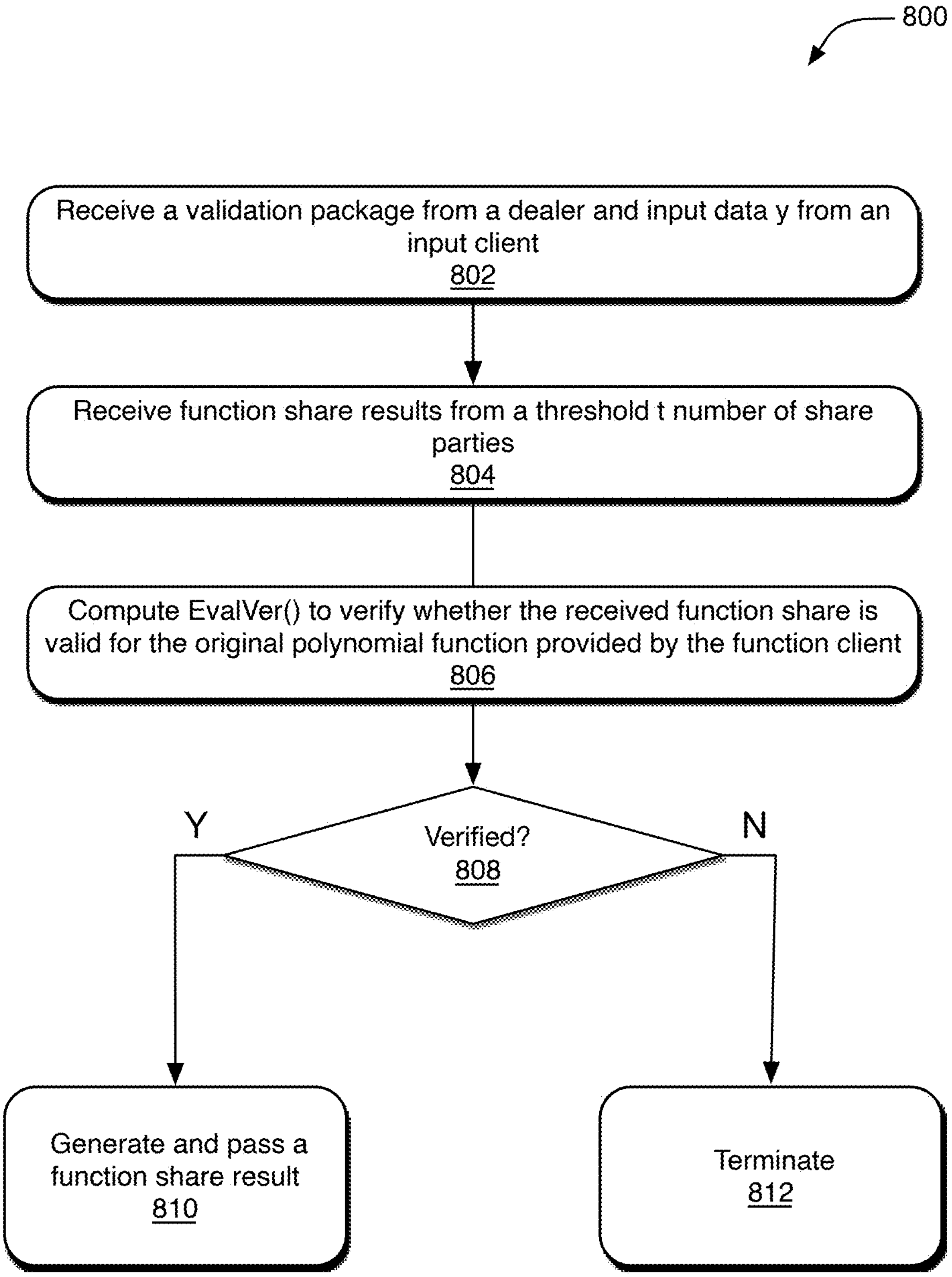

FIG. 8

VERIFIABLE POLYNOMIAL FUNCTION SECRET SHARING

SUMMARY

In some aspects, the techniques described herein relate to a computing-processor-implemented method for polynomial function secret sharing by a dealer, wherein a polynomial function of a function client is shared by the dealer and is verifiable by multiple share parties and the function client generates a signed concatenation of first validation parameters, the computing-processor-implemented method including: receiving, by the dealer, a first addend function and a second addend function, wherein a sum of the first addend function and the second addend function equals the polynomial function and each first validation parameter corresponds to a coefficient of the first addend function and a corresponding coefficient of the second addend function; generating, by the dealer, a function share for each share party based on a sampling of first random polynomials and second random polynomials; generating, by the dealer, second validation parameters for each share party based on the function shares, each second validation parameter for each share party corresponding to a coefficient of the first random polynomials or the second random polynomials; transmitting, by the dealer, the second validation parameters to the share parties; and transmitting, by the dealer, each function share to a corresponding share party, wherein each function share is verifiable by the corresponding share party as being a share of the polynomial function received by the dealer from the function client, verification being based on the second validation parameters and the signed concatenation of the first validation parameters.

In some aspects, the techniques described herein relate to a computing system for polynomial function secret sharing by a dealer, wherein a polynomial function of a function client is shared by the dealer and is verifiable by multiple share parties and the function client generates a signed concatenation of first validation parameters, the computing system including: one or more hardware processors; a communication interface executable by the one or more hardware processors and configured to receive a first addend function and a second addend function, wherein a sum of the first addend function and the second addend function equals the polynomial function and each first validation parameter corresponds to a coefficient of the first addend function and a corresponding coefficient of the second addend function; a function share generator executable by the one or more hardware processors and configured to generate a function share for each share party based on a sampling of first random polynomials and second random polynomials; and a validation parameter generator executable by the one or more hardware processors and configured to generate second validation parameters for each share party based on the function shares, each second validation parameter for each share party corresponding to a coefficient of the first random polynomials or the second random polynomials, wherein the communication interface is further configured to transmit the second validation parameters to the share parties and to transmit each function share to a corresponding share party, wherein each function share is verifiable by the corresponding share party as being a share of the polynomial function received by the dealer from the function client, verification being based on the second validation parameters and the signed concatenation of the first validation parameters.

In some aspects, the techniques described herein relate to one or more tangible processor-readable storage media embodied with instructions for executing on one or more processors and circuits of a computing device a process for polynomial function secret sharing by a dealer, wherein a polynomial function of a function client is shared by the dealer and is verifiable by multiple share parties and the function client generates a signed concatenation of first validation parameters, the process including: receiving, by the dealer, a first addend function and a second addend function, wherein a sum of the first addend function and the second addend function equals the polynomial function and each first validation parameter corresponds to a coefficient of the first addend function and a corresponding coefficient of the second addend function; generating, by the dealer, a function share for each share party based on a sampling of first random polynomials and second random polynomials; generating, by the dealer, second validation parameters for each share party based on the function shares, each second validation parameter for each share party corresponding to a coefficient of the first random polynomials or the second random polynomials; transmitting, by the dealer, the second validation parameters to the share parties; and transmitting, by the dealer, each function share to a corresponding share party, wherein each function share is verifiable by the corresponding share party as being a share of the polynomial function received by the dealer from the function client, verification being based on the second validation parameters and the signed concatenation of the first validation parameters.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 4 illustrates example operations for dealing function shares of a polynomial function in a verifiable polynomial function secret sharing system.

FIG. 8 illustrates example operations for reconstructing a reconstructed result of the polynomial function on input data in a verifiable polynomial function secret sharing system.

DETAILED DESCRIPTIONS

Many computer-implemented algorithms in various industries have become incredibly valuable to the companies that developed them. For example, Netflix and YouTube have proprietary recommendation algorithms that provide immense value to both users (for finding content) and the company (to keep users on the platform). Such companies, therefore, wish to protect these algorithms, which are essentially functions (e.g., recommendation algorithms) on some input (e.g., user viewing history, user browser history, user purchase history, user preferences). Some of these inputs may also contain private information that users do not wish the companies to learn. Function secret sharing, which allows servers to compute a function on input data in a distributed fashion (without the servers ever learning the function itself), is one such method of protecting algorithms. However, if a server becomes corrupted or hacked by an adversary, a company will not want to incorporate that server's contribution into its function computation. Thus, the described technology introduces a model for verifiable function secret sharing over a finite field, which allows companies to check at each step in the distributed computation workflow that the information used to compute a proprietary algorithm is correctly formed and free of adversarial influence. This approach is deemed "verifiable function secret sharing" or VFSS.

As will be discussed in more detail with respect to FIG. 1, the described technology involves various parties, including without limitation a function client, a dealer party ("dealer"), multiple share parties, a reconstructor party ("reconstructor"), and an input client, wherein computation on a proprietary function can be outsourced to multiple independent servers (e.g., share parties). Generally, the term "party" refers to one or more multiple computing entities, such as computer servers, workstations, IoT devices, peripherals, etc., and performing one of the listed party roles (e.g., function client, dealer, share party, reconstructor, input client). The function client is a party that provides the actual function to the servers. The input client provides the input data to the share parties and receives the reconstructed result of the polynomial function computed on the input data. In an example context of a Netflix recommendation model, Netflix (the function client) provides a recommendation algorithm (the function), and the Netflix subscriber (the input client) provides their viewing history and receives the computed recommendation itself (the reconstructed result) based on computations of function shares by the servers (the share parties) on the input data.

Figure 1:
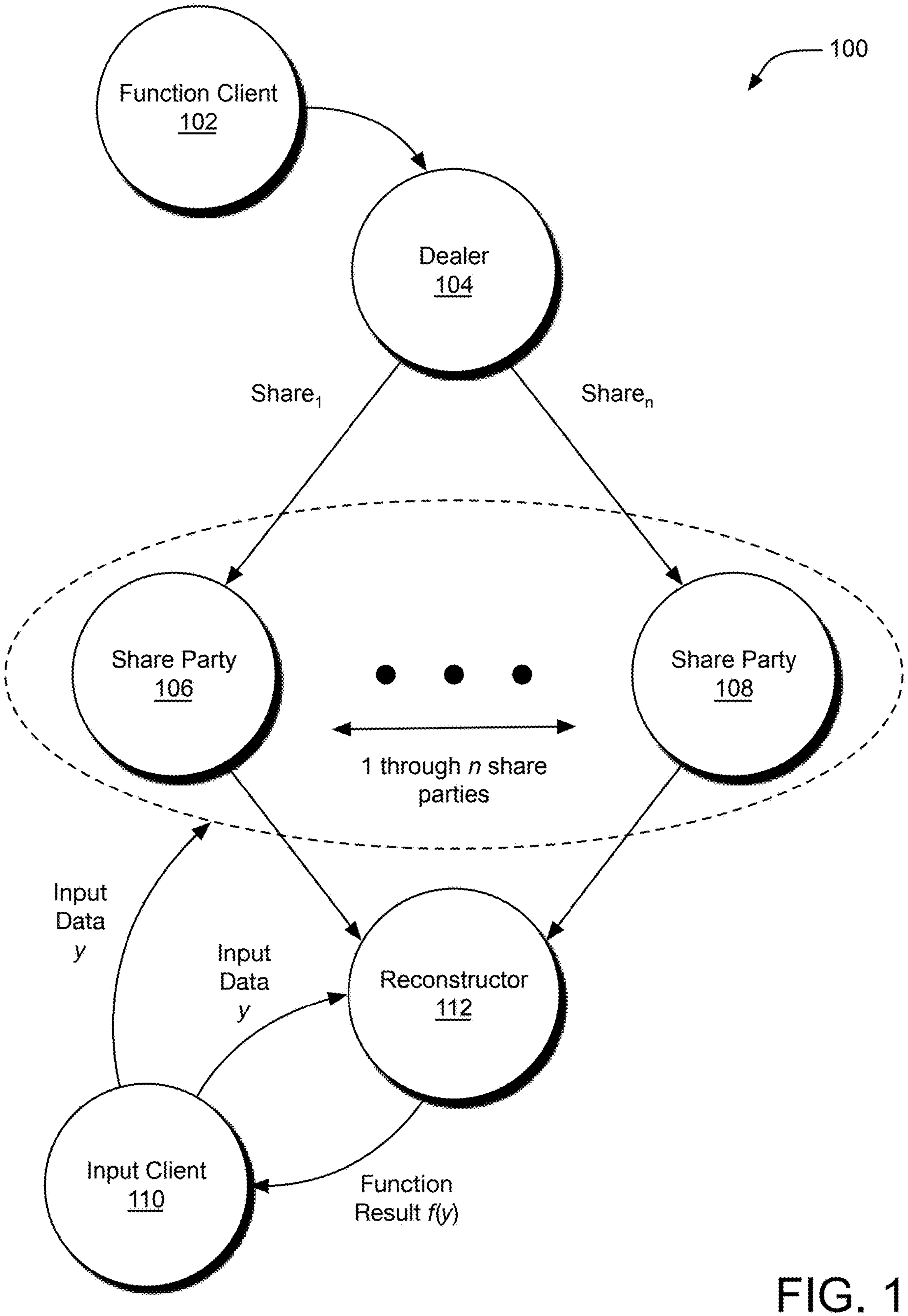
FIG. 1 illustrates an example verifiable polynomial function secret sharing system providing a reconstructed result of a polynomial function on input data y.

FIG. 1 illustrates an example verifiable polynomial function secret sharing system 100 providing a reconstructed result of a polynomial function $f$ on input data y. A function client 102 is a party that inputs the polynomial function to the verifiable polynomial function secret sharing system 100. In the Netflix example, the function client 102 could be Netflix, which provides a recommendation algorithm as a polynomial function to the verifiable polynomial function secret sharing system 100. The verifiable polynomial function secret sharing system 100 includes a public key infrastructure in which the function client 102 has communicated a public key to other parties in the system (e.g., share parties, a dealer, a reconstructor, and an input client). The public key is used by the parties to verify a signed concatenation of the first validation parameters.

The function client 102 provides the (secret) polynomial function to a dealer 104, a party configured to cryptographically generate function shares based on the provided polynomial function and distribute the function shares (e.g., $Share_1, \ldots . Share_n$) to multiple share parties (e.g., 1 through n shares parties-share party 106 to share party 108), one function share to each share party. In the Netflix example, the share parties could be computing servers in one or more data centers that are used by Netflix to perform a distributed computation of a recommendation algorithm (e.g., the provided polynomial function) on input data y (e.g., a Netflix subscriber's viewing history).

In support of the verifiability aspect of the verifiable polynomial function secret sharing system 100, in one implementation, the function client 102 also computes and communicates a set of first validation parameters to the dealer 104 in a signed, concatenated form (the signed form is designated as S), and the dealer 104 can forward these validation parameters to other parties. In another implementation, the function client 102 can, additionally or alternatively, communicate the validation parameters to the other parties directly.

The dealer 104 computes a set of second validation parameters and broadcasts this set of second validation parameters to all of the share parties and to a reconstructor 112, discussed in more detail below.

Two or more of the share parties receive the input data y (e.g., from an input client 110) and perform evaluations of the provided function shares on the input data y (e.g., compute a result of a function share on the input data y) to yield function share results. If a threshold number of function share results are computed and passed to the reconstructor 112 (a reconstructor party), the reconstructor 112 can combine the function share results to yield a reconstructed result $f(y)$ of the polynomial function on the input data y. In the Netflix example, the reconstructed result $f(y)$ could be a list of recommended shows to present to a user based on the user's viewing history and preferences. In this workflow, the polynomial function itself is not discoverable by the share parties, the reconstructor 112, or the input client 110.

The described technology is directed to performing this polynomial function secret sharing in such a way as to allow the share parties, the reconstructor 112, and/or the input client 110 to verify that the aspects of the polynomial function upon which they operate are valid (e.g., are based on the same polynomial function provided to the dealer 104 by the function client 102). As such, the function client 102 and the dealer 104 can generate validation parameters that are shared with the share parties, the reconstructor 112, and/or the input client 110 to support such verification by these parties, as described in more detail below.

Figure 2:
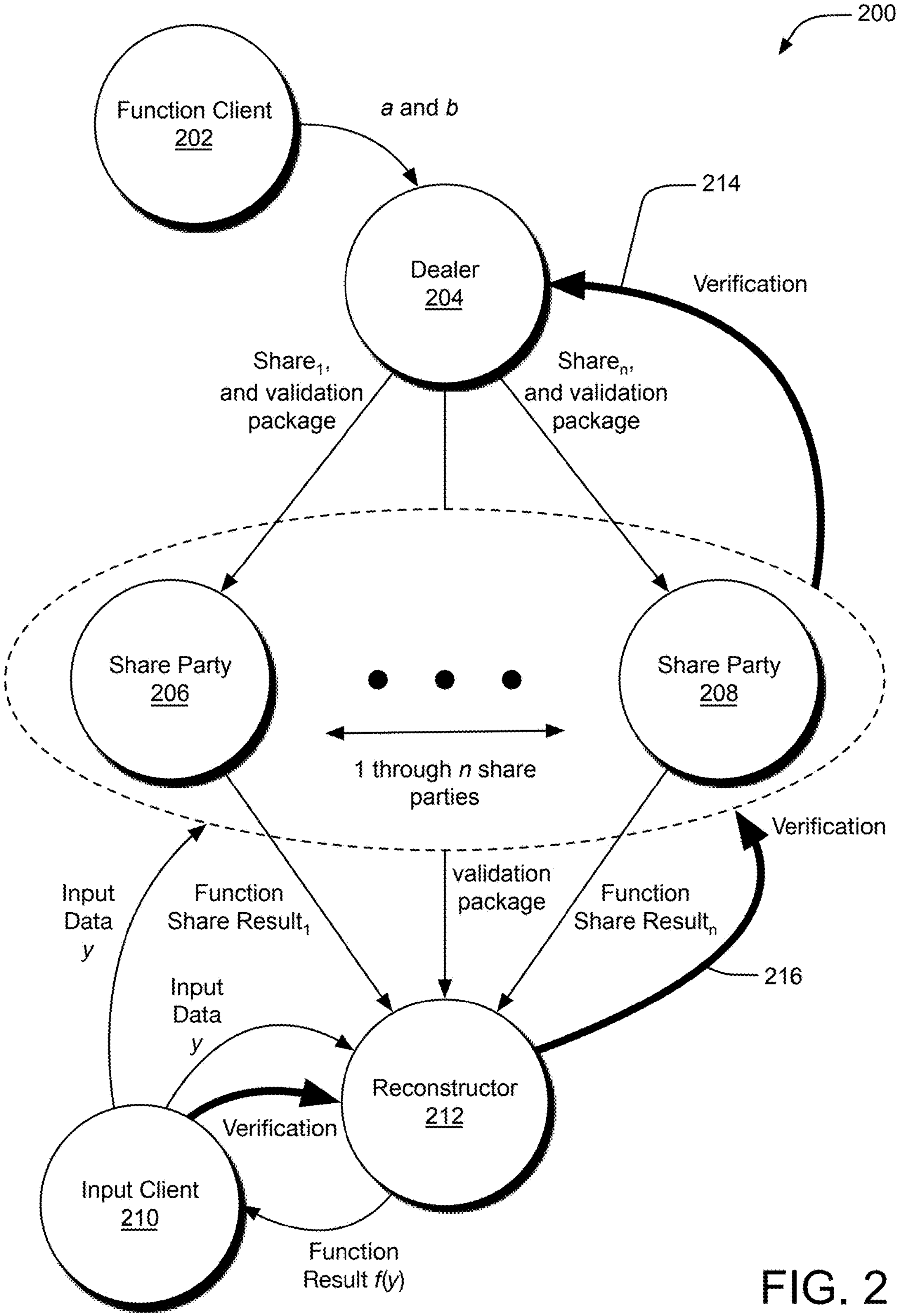
FIG. 2 illustrates an example verifiable polynomial function secret sharing system capable of supporting multiple verification operations in a polynomial function secret sharing workflow.

FIG. 2 illustrates an example verifiable polynomial function secret sharing system 200 capable of supporting multiple verification operations in a polynomial function secret sharing workflow. The verifiable polynomial function secret sharing system 200 includes a function client 202, a dealer 204, n share parties (e.g., share party 206 to share party 208), a reconstructor 212, and an input client 210, which are the same as or similar to those parties described with regard to FIG. 1. A detailed description of the sharing, computation, and reconstruction aspects of the polynomial function secret sharing flow is provided with regard to FIG. 2. Details of the verification aspects will be provided with regard to subsequent figures.

A model is defined for a verifiable function secret sharing (VFSS) system with the function client 202 and the input client 210 as follows. Let $\mathcal{D}$ be the dealer, and let $P_1, \ldots, P_n$ be the n parties or servers for computation. Let $\mathcal{C}_F$ be the function client 202 that supplies the function, and $\mathcal{C}_I$ be the input client 210 that provides input to the parties and, at least in one implementation, also receives the reconstructed result of the polynomial function on the input data y (e.g., the function output). Finally, let R be the reconstructor 212, which may or may not be one of the share parties $P_i$. The following operations demonstrate an example verifiable function secret sharing flow, although variations of the operations described below are contemplated for other implementations.

The verifiable polynomial function secret sharing system 200 includes a public key infrastructure in which the function client 202 has communicated a public key to other parties in the system (e.g., share parties, a dealer, a reconstructor, and an input client). The public key is used by the parties to verify a signed concatenation of the first validation parameters.

The function client 202 ($\mathcal{C}_F$) sends a (secret) polynomial function $p \in \mathcal{F}$ to the dealer 204 ($\mathcal{D}$), which the dealer 204 will share among n share parties $P_1, \ldots, P_n$ as function $\text{shares}_1$-$\text{shares}_n$. In one implementation, the function client 202 sends the function p to the dealer 204 by randomly splitting p into two polynomials a, $b \in \mathbb{F}[x]$ such that $a(x)+b(x)=p(x)$ and the degree of p is equal to d and the degrees of a and b are less than or equal to d, where $$p(x) = p_d x^d + p_{d-1} x^{d-1} \ldots + p_0$$

$$a(x) = a_d x^d + a_{d-1} x^{d-1} \ldots + a_0$$

$$b(x) = b_d x^d + b_{d-1} x^{d-1} \ldots + b_0.$$

The function client 202 also samples generators g and h and generates a set of first validation parameters $c_0, \ldots, c_d$, where $$c_j = (g^{a_j}, h^{b_j})$$

for $0 \le j \le d$, where g and h are random elements sampled from a cyclic group G, which has order equal to the order of a finite field $\mathbb{F}$ and in which the discrete log problem is hard. In other implementations, elements g and h may be public parameters of the scheme, not necessarily generated by the function client 202. The elements g and h are communicated to the dealer 204. In addition, the function client 202 signs the concatenation of c; to yield $$S = \text{sign}(c_0 \| c_1 \| \ldots \| c_d)$$

and passes a and b to the dealer. In one implementation, the function client 202 also sends the set of first validation parameters and/or S to each share party. Alternatively, or additionally, the function client 202 can send the set of first validation parameters and/or the signed concatenation thereof(S) to the dealer 204, which can send the first validation parameters and S to each share party and/or the reconstructor 212.

The dealer 204 samples 2(d+1) random polynomials $\alpha_0, \ldots, \alpha_d, \beta_0, \ldots, \beta_d \in \mathbb{F}[x]$, each of degree t−1, where t is the threshold for the polynomial function secret sharing scheme, and $$\alpha_j(0) = a_j,\ \beta_j(0) = b_j$$

for $0 \le j \le d$, where the coefficients of the random polynomials equal the constant terms of the addend polynomials a(x) and b(x). With the polynomials $\alpha_0, \ldots, \alpha_d, \beta_0, \ldots, \beta_d$, the dealer 204 computes function shares $f_i = (\alpha_0(i), \ldots, \alpha_d(i), \beta_0(i), \ldots, \beta_d(i))$ and distributes each function share $f_i$ to the corresponding share party $P_i$, $1 \le i \le n$ (e.g., $f_1$ is sent to $P_1$, $f_2$ is sent to $P_2$, etc.).

The dealer 204 also computes a set of 2n (d+1) second validation parameters $g^{\alpha_j(i)}$, and $h^{\beta_j(i)}$ for all $0 \le j \le d$, $1 \le i \le n$, where coefficients of the random polynomials $\alpha_0, \ldots, \alpha_d, \beta_0, \ldots, \beta_d$ are used as exponents with respect to the (generator) bases g and h. The dealer 204 broadcasts a validation package to the share parties and the reconstructor 212. In this phase, the validation package includes the set of first validation parameters, the set of second validation parameters, and the signed concatenation of the set of first validation parameters (S). (It should be understood that other implementations may modify the contents of the validation package. For example, if the function client 202 sent the set of first validation parameters to the share parties and/or the reconstructor 212, then the validation package need not include these parameters.) The dealer can also broadcast $c_0, \ldots, c_d$ and the signature S to the share parties and the reconstructor.

To verify that the function share received by a share party $P_i$ is valid (e.g., a valid function share of the secret polynomial function p(x), as indicated in the bold arrow 214), the share party computes $\text{GenVer}(f_i, c_i)$, which includes as input the function share $f_i$ for share party $P_i$ and all of the $c_i$ elements (i.e., elements of the set of first validation parameters). If the computation returns 0, the share party reports an error and halts the polynomial function secret sharing process. If this computation returns 1, the share party has verified its function share.

Each share party can employ a verification function to verify that its function share is valid. In one implementation, the verification function (GenVer) described below is employed, although variations may be employed. Note each share party $P_i$ has the following information:

1. The messages $c_0, c_1, \ldots, c_d$ from the validation package, where $$c_j = (g^{a_j}, h^{b_j})$$

for each coefficient $a_j$, $b_j$ of a(x), b(x) respectively. Each share party can verify that they possess the correct $c_j$ through the signature S, also provided in the validation package.

2. The shares $g^{\alpha_j(i)}$ and $h^{\beta_j(i)}$ (e.g., a set of second validation parameters) for all $0 \le j \le d$ and $1 \le i \le n$, provided in the validation package.
3. The specific function share $f_i$ of share party $P_i$ $$f_i = (\alpha_0(i), \ldots, \alpha_d(i), \beta_0(i), \ldots, \beta_d(i))$$

For each j, share party $P_i$ selects t values of i and determines a linear relation using interpolation (renumbering without loss of generality):

$$a_j = \gamma_1\alpha_j(1) + \gamma_2\alpha_j(2) + \ldots + \gamma_t\alpha_j(t)$$
$$b_j = \delta_1\beta_j(1) + \delta_2\beta_j(2) + \ldots + \delta_t\beta_j(t)$$

where each $\gamma_i$ and $\delta_i$ lie in $\mathbb{F}$. This is possible since $\alpha_j$ and $\beta_j$ are degree t−1 polynomials. Now that $P_i$ knows $\gamma_j$ and $\delta_j$, $P_i$ verifies that $$g^{a_j} = \prod_{i=1}^{t} \left(g^{\alpha_j(i)}\right)^{\gamma_j}$$
$$h^{b_j} = \prod_{i=1}^{t} \left(h^{\beta_j(i)}\right)^{\delta_j}$$

where the left-hand-side (LHS) values come from the signed concatenation of $c_j$ and the right-hand-side (RHS) bases come from the dealer's broadcast/transmission.

Now, for each $(t+1) \le k \le n$, $P_i$ again determines a linear relation $$\alpha_j(k) = \zeta_1\alpha_j(1) + \zeta_2\alpha_j(2) + \ldots + \zeta_t\alpha_j(t)$$
$$\beta_j(k) = \eta_1\beta_j(1) + \eta_2\beta_j(2) + \ldots + \eta_t\beta_j(t)$$

where each $\zeta_i$, $\eta_i$ lie in $\mathbb{F}$. The share party $P_i$ again verifies that $$g^{\alpha_j(k)} = \prod_{i=1}^{t} \left(g^{\alpha_j(i)}\right)^{\zeta_j}$$
$$h^{\beta_j(k)} = \prod_{i=1}^{t} \left(h^{\beta_j(i)}\right)^{\eta_j}$$

where the LHS values and RHS bases come from the dealer's broadcast/transmission. Accordingly, the share party $P_i$ uses its function shares $\alpha_j(i)$ and $\beta_j(i)$ to verify that the values of the second validation parameters it has received are correct.

Returning to the flow through FIG. 2, an input client 210 ($\mathcal{C}_I$) sends input data y to the share parties $P_i$ and the reconstructor 212 (R). Each $P_i$ then computes its function share result $r_i$ (also called a function share result) using the input x, generating a result of their function share evaluated using the input x. The share parties $P_1, \ldots, P_n$ send their respective function share results to the reconstructor 212.

Having received the function share results from a threshold t number of share parties, the reconstructor 212 can verify that the function share results received by the reconstructor 212 are valid (e.g., a valid function share result of an evaluation of the secret polynomial function p(x) on the input data y, as indicated in the bold arrow 216) by computing EvalVer( ). If the computation returns 0, the reconstructor 212 reports an error and halts the polynomial function secret sharing process. If this computation returns 1, the reconstructor 212 has verified the function share results received from the share parties, and the reconstructor 212 computes $f(y)=r=\text{Rec}(r_1, \ldots, r_n)$ and sends the function result and the validation parameters to the input client 210 ($\mathcal{C}_I$).

As described, the reconstructor 212 can employ a verification function to verify that its function share results are valid. In one implementation, the verification function (EvalVer) described below is employed, although variations may be employed. If the computation returns 0, the reconstructor 212 reports an error and halts the polynomial function secret sharing process. If this computation returns 1, the reconstructor 212 has verified that a sufficient number of function share results are valid and can reconstruct a(x) and b(x) using t choices of the $r_i$ and t choices of the $s_i$ and then reconstruct the function result r, as described below.

In one implementation, the reconstructor 212 can use a verification function (EvalVer) as described below, although other verification functions may be employed. For verification, note that the reconstructor 212 has the following information:

1. The input data y (which is input as x into the operations below).
2. The shares $g^{\alpha_j(i)}$ and $h^{\beta_j(i)}$ for all $0 \le j \le d$ and $1 \le i \le n$.
3. The reconstruction shares $$r_i = (\alpha_0(i), \alpha_1(i), \ldots, \alpha_d(i)) \cdot (1, x, \ldots, x^d)$$
$$s_i = (\beta_0(i), \beta_1(i), \ldots, \beta_d(i)) \cdot (1, x, \ldots, x^d)$$
$$\text{for } 1 \le i \le n.$$

Therefore, for each i, $1 \le i \le n$, the reconstructor 212 checks that $$g^{r_i} = \prod_{j=0}^{d} \left(g^{\alpha_j(i)}\right)^{x^j}$$
$$h^{s_i} = \prod_{j=0}^{d} \left(h^{\beta_j(i)}\right)^{x^j}$$

where the RHS bases come from the dealer's broadcast/transmission. If these equalities are true for at least t choices, then the reconstructor 212 has verified the validity of a threshold t number of function share results and can reconstruct a(x) and b(x) using t choices of the $r_i$ and t choices of the $s_i$ for which the above equalities hold true.

Therefore, the reconstructor 212 runs a Rec function to reconstruct a(x) and b(x) using t correct choices of the $r_i$ and t correct choices of the $s_i$ and sends the reconstructed function result $f(y)$ of the evaluation of the polynomial p(x) on the input data y (r=(a(x), b(x))) to the input client 210 ($\mathcal{C}_I$).

Having received the reconstructed function result r, the input client 210 ($\mathcal{C}_I$) can employ a verification function to verify that its reconstructed function result is valid. In one implementation, the verification function (Rec Ver) described below is employed, although variations may be employed. Accordingly, the input client 210 runs RecVer(r, $c_1, \ldots, c_n$, x). If the verification function computation returns 0, the input client 210 reports an error and halts the polynomial function secret sharing process. If the verification function computation result outputs 1, $\mathcal{C}_I$ outputs r as the function output $f(y)$.

In one implementation, the input client 210 can use a verification function as described below, although other verification functions may be employed. Note that the client $\mathcal{C}_I$ now has 1. The (signed) validation parameters $c_0, c_1, \ldots, c_d$, where $$c_j = \left(g^{a_j}, h^{b_j}\right)$$

for each coefficient $a_j$, $b_j$ of a(x), b(x), respectively (as well as S to check their veracity).

2. The reconstructed values a(x) and b(x) from the reconstructor R.

Accordingly, the input client 210 verifies that $$g^{a(x)} = \prod_{j=0}^{d} (g^{a_j})^{x^j}$$

$$h^{b(x)} = \prod_{j=0}^{d} \left(h^{b_j}\right)^{x^j}$$

where the RHS bases come from the passed-along dealer validation package. If so, the client outputs a(x)+b(x) as the evaluation p(x) on input data y (e.g., the function result r=$f$(y)).

Figure 3:
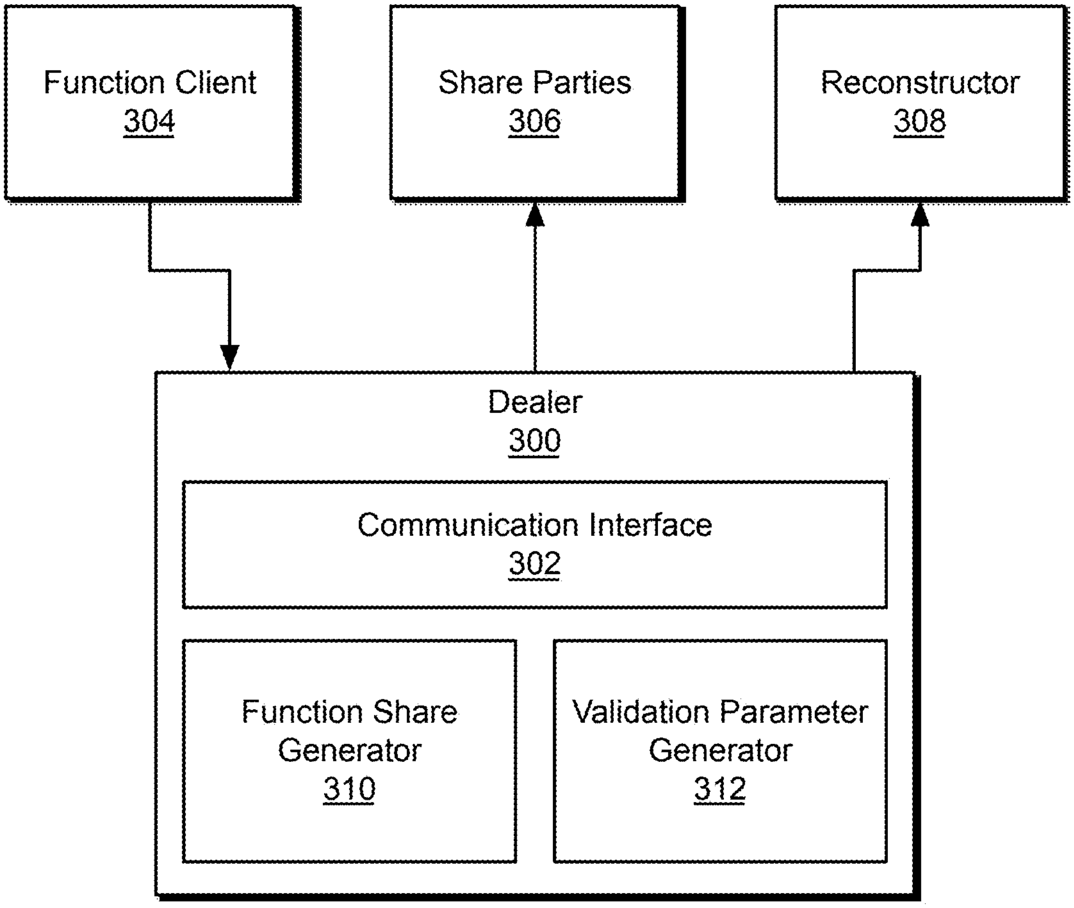
FIG. 3 illustrates an example dealer capable of dealing function shares in a verifiable polynomial function secret sharing system.

FIG. 3 illustrates an example dealer 300 capable of dealing function shares in a verifiable polynomial function secret sharing system. In one implementation, a communication interface 302 of the dealer 300 receives from a function client 304 a first addend function and a second addend function. The communication interface 302 may also receive a signed concatenation of first validation parameters, which it can communicate to other parties. Each first validation parameter corresponds to a coefficient of the first addend function and a corresponding coefficient of the second addend function. A sum of the first addend function and the second addend function equals the polynomial function to be shared to multiple share parties 306. In some implementations, the function client 304 can also or alternatively send the first validation parameters (signed and/or unsigned) to the share clients and/or the reconstructor.

A function share generator 310 generates a function share for each share party based on a sampling of first random polynomials and second random polynomials. A validation parameter generator 312 generates second validation parameters for each share party based on the function shares. Each second validation parameter for each share party corresponds to a coefficient of the first random polynomials or the second random polynomials.

The communication interface 302 transmits the second validation parameters to the share parties and a reconstructor 308 in a validation package and transmits each function share to a corresponding share party of the share parties. The validation package may also include the first validation parameters and/or a signed concatenation of the first validation parameters. The dealer 300 can also broadcast $c_0, \ldots, c_d$ and the signature S to the share parties 306 and the reconstructor 308. Each function share is verifiable by the corresponding share party as being a share of the polynomial function received by the dealer from the function client, where verification is based on the signed concatenation of the first validation parameters and the set of second validation parameters.

FIG. 4 illustrates example operations 400 for dealing function shares of a polynomial function in a verifiable polynomial function secret sharing system. The polynomial function of a function client is shared by the dealer and is verifiable by multiple share parties. A receiving operation 402 receives a first addend function and a second addend function. Each first validation parameter corresponds to a coefficient of the first addend function and a corresponding coefficient of the second addend function, wherein a sum of the first addend function and the second addend function equals the polynomial function. In some implementations, the function client can also or alternatively send the first validation parameters (signed and/or unsigned) to the share clients and/or the reconstructor. A generating operation 404 generates a function share for each share party based on a sampling of first random polynomials and second random polynomials. Another generating operation 406 generates second validation parameters for each share party based on the function shares. Each second validation parameter for each share party corresponds to a coefficient of the first random polynomials or the second random polynomials.

A transmitting operation 408 transmits the second validation parameters to the share parties. Another transmitting operation 410 transmits each function share to a corresponding share party. Each function share is verifiable by the corresponding share party as being a share of the polynomial function received by the dealer from the function client, where verification is based on the signed concatenation of the first validation parameters and the set of second validation parameters.

Figure 5:
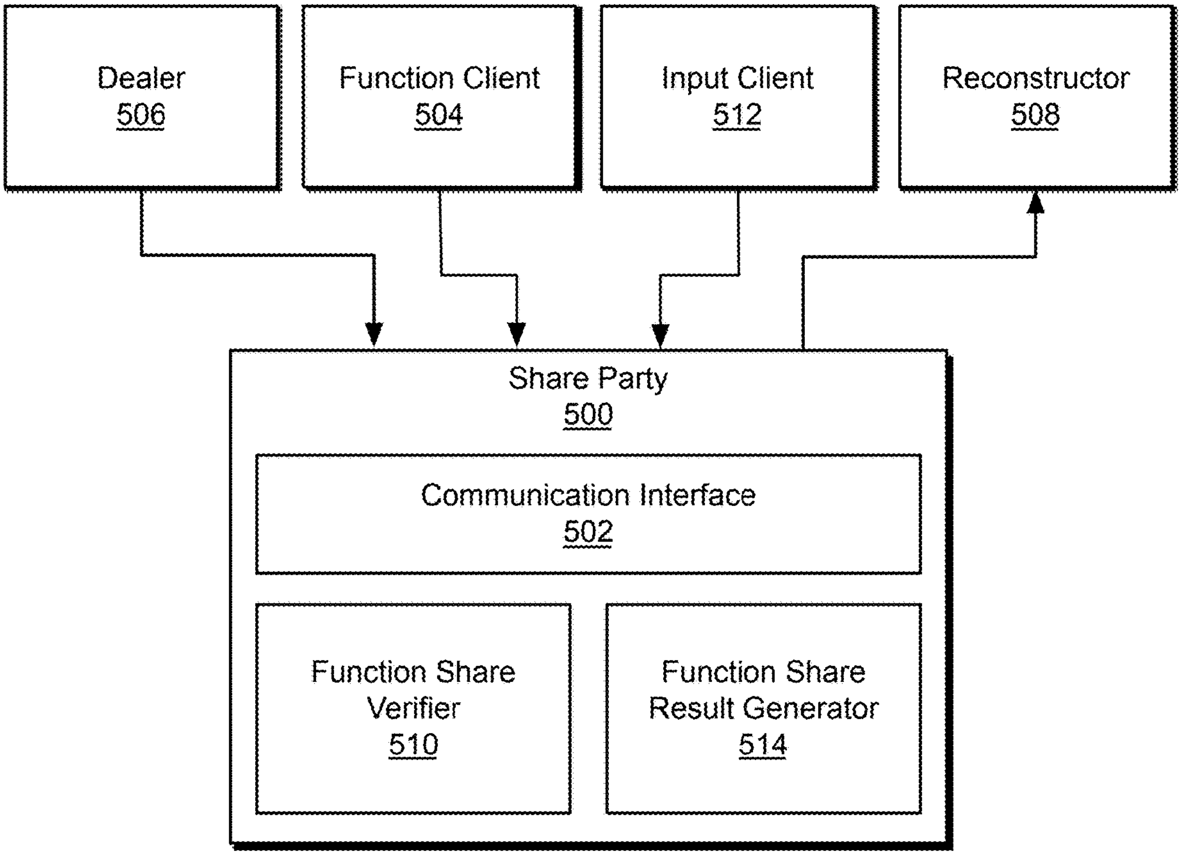
FIG. 5 illustrates an example share party capable of evaluating function shares on input data in a verifiable polynomial function secret sharing system.

FIG. 5 illustrates an example share party 500 capable of evaluating function shares on input data in a verifiable polynomial function secret sharing system. A communication interface 502 of the share party 500 receives a signed concatenation of first validation parameters generated by the function client 504, although, in some implementations, the set of first validation parameters is received by the share party 500 from a dealer 506 instead. The communication interface 502 also receives from the dealer 506 a function share and a validation package. The validation package includes a set of second validation parameters generated by the dealer 506. (The dealer 506 also sends the validation package to a reconstructor 508.) The communication interface 502 also receives input data y from an input client 512.

A function share verifier 510 computes GenVer( ) to verify whether the received function share is valid for the original polynomial function provided by the function client 504. See more description of GenVer( ) above. If the function share verifier 510 cannot verify the validity of the function share, the share party 500 does not generate and pass a function share result based on the function share. Otherwise, a function share result generator 514 evaluates the function share based on the input data y to generate a function share result, which the communication interface 502 passes on to the reconstructor 508.

Figure 6:
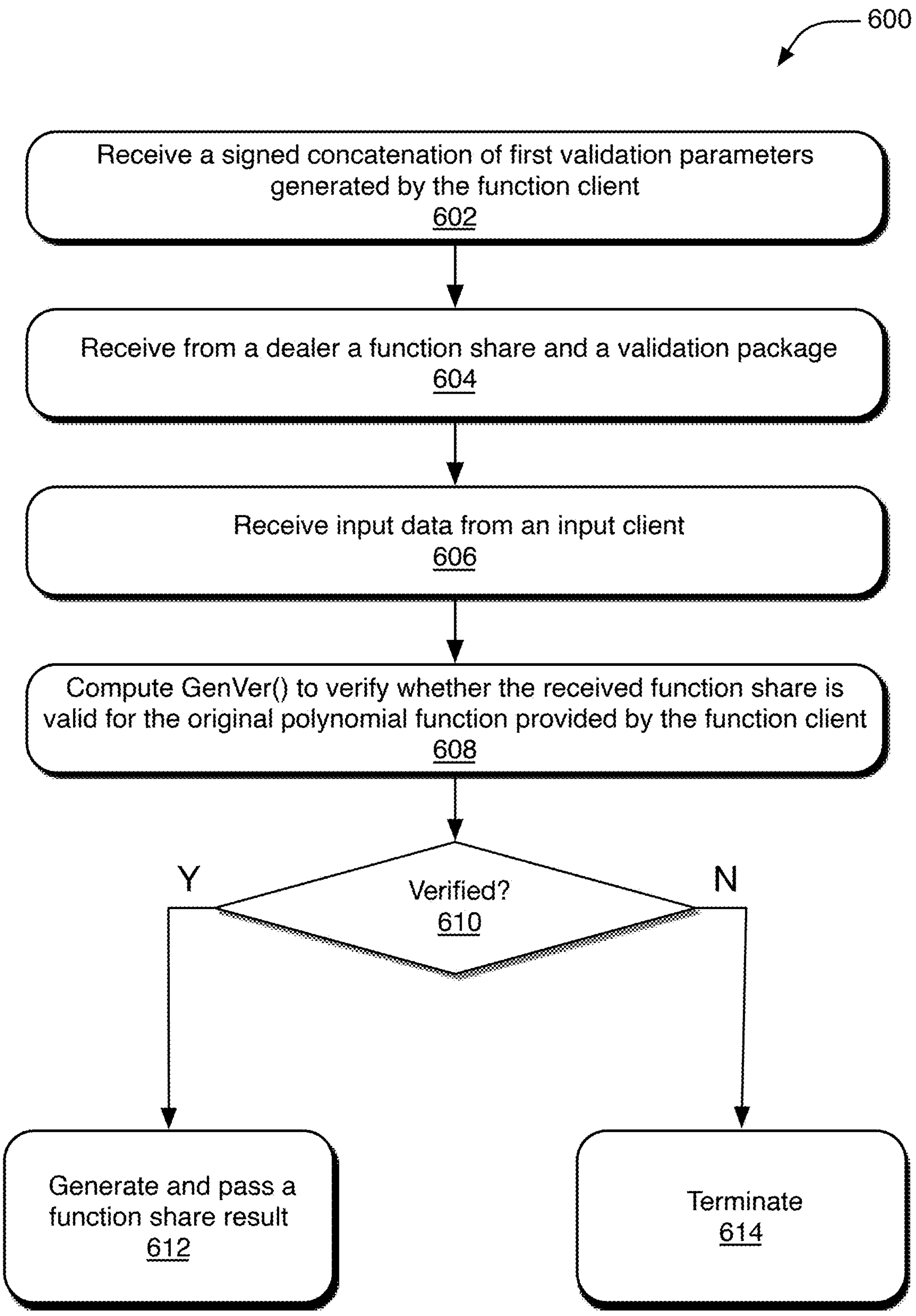
FIG. 6 illustrates example operations for executing function shares on input data in a verifiable polynomial function secret sharing system.

FIG. 6 illustrates example operations 600 for executing function shares on input data in a verifiable polynomial function secret sharing system. A communication operation 602 of a share party receives, from a function client and via a communication interface of the share party, a signed concatenation set of first validation parameters generated by the function client, although, in some implementations, the signed concatenation of first validation parameters are received by the share party from the dealer instead. A communication operation 604 of the share party also receives, from a dealer via the communication interface, a function share and a validation package. The validation package includes a set of second validation parameters generated by the dealer. A communication operation 606 of the share party also receives input data y from an input client via the communication interface.

A verification operation 608 of the share party computes GenVer( ) to verify whether the received function share is valid for the original polynomial function provided by the function client. See more description of GenVer( ) above. If the verification operation 608 cannot verify the validity of the function share, as determined by a decision operation 610, the share party does not generate and pass a function share result based on the function share, thereby terminating the process at termination operation 614. Otherwise, If the verification operation 608 does verify the validity of the function share, as determined by the decision operation 610, a generation operation 612 of the share party evaluates the function share based on the input data y to generate a function share result, which the communication interface can pass on to a reconstructor.

Figure 7:
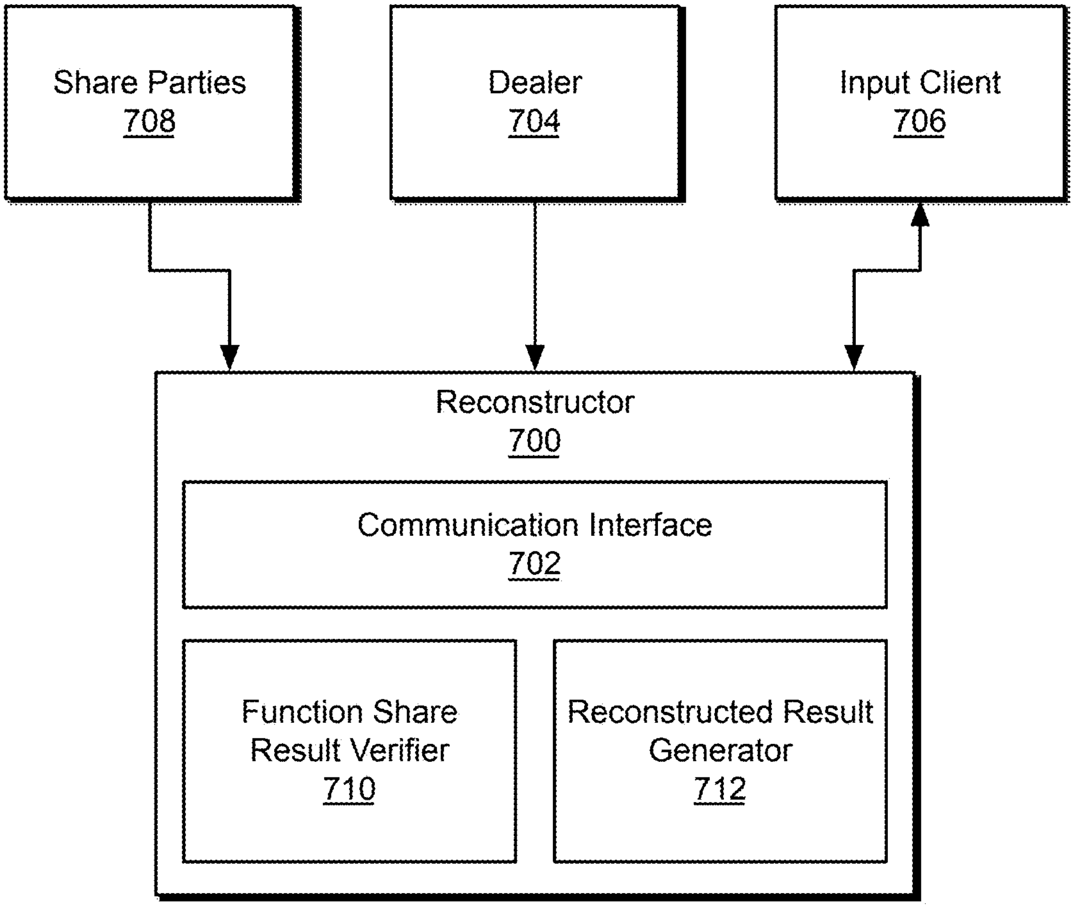
FIG. 7 illustrates an example reconstructor capable of reconstructing a reconstructed result of the polynomial function on input data in a verifiable polynomial function secret sharing system.

FIG. 7 illustrates an example reconstructor 700 capable of reconstructing a reconstructed result of the polynomial function on input data in a verifiable polynomial function secret sharing system. A communication interface 702 receives a validation package from a dealer 704 and input data y from an input client 706. The communication interface 702 also receives function share results from a threshold t number of share parties 708.

A function share result verifier 710 computes EvalVer( ) to verify whether the received function share result is valid for the original polynomial function provided by the function client (not shown) to the dealer 704. See more description of EvalVer( ) above. If the function share result verifier 710 cannot verify the validity of the function share, the reconstructor 700 does not generate and pass a reconstructed result based on the received function share results. Otherwise, if function share result verifier 710 does verify the validity of the function share, a reconstructed result generator 712 uses a Rec( ) function to combine the function share results into a reconstructed result, which the communication interface 702 passes on to the input client 706.

FIG. 8 illustrates example operations 800 for reconstructing a reconstructed result of the polynomial function on input data in a verifiable polynomial function secret sharing system. A communication operation 802 receives a validation package from a dealer and input data y from an input client. A communication operation 804 also receives function share results from a threshold t number of share parties.

A verification operation 806 computes EvalVer( ) to verify whether the received reconstruction result is valid for the original polynomial function provided by the function client (not shown) to the dealer. See more description of EvalVer( ) above. If the verification operation 806 cannot verify the validity of the function share, as determined by a decision operation 808, the reconstructor does not generate and pass a reconstructed result based on the received function share results, thereby terminating the process at termination operation 812. Otherwise, if the verification operation 806 does verify the validity of the function share, as determined by a decision operation 808, a generation operation 810 uses a Rec( ) function to combine the function share results into a reconstructed result, which the reconstructor passes on to the input client.

Figure 9:
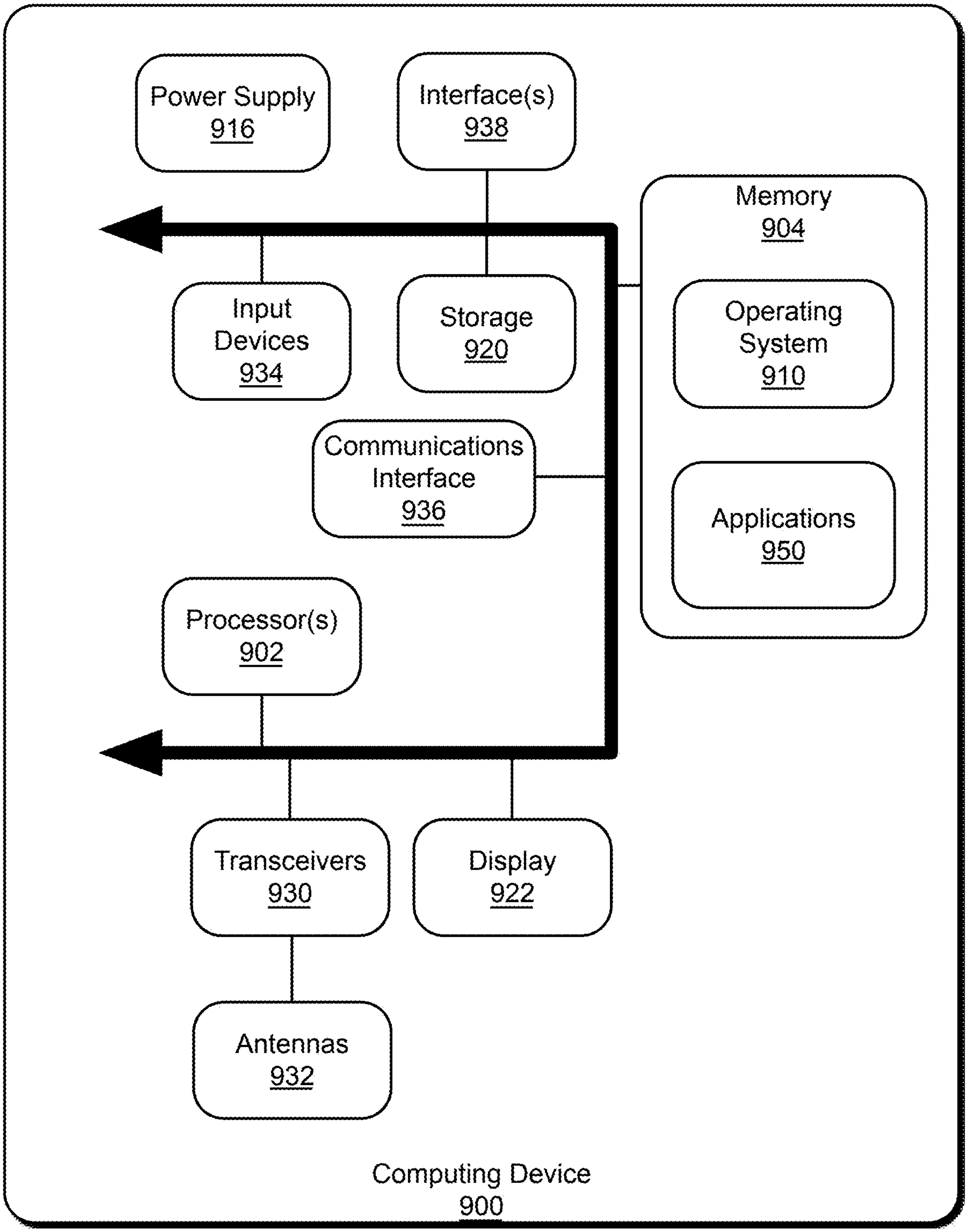
FIG. 9 illustrates an example computing device for use in implementing the described technology.

FIG. 9 illustrates an example computing device 900 for use in implementing the described technology. The computing device 900 may be a client computing device (such as a laptop computer, a desktop computer, or a tablet computer), a server/cloud computing device, an Internet-of-Things (IoT), any other type of computing device, or a combination of these options. The computing device 900 includes one or more hardware processor(s) 902 and a memory 904. The memory 904 generally includes both volatile memory (e.g., RAM) and nonvolatile memory (e.g., flash memory), although one or the other type of memory may be omitted. An operating system 910 resides in the memory 904 and is executed by the processor(s) 902. In some implementations, the computing device 900 includes and/or is communicatively coupled to storage 920.

In the example computing device 900, as shown in FIG. 9, one or more software modules, segments, and/or processors, such as applications 950, communication interfaces, function share generators, validation parameter generators, function share verifiers, function share result generators, function share result verifiers, reconstruction result generators, and other program code and modules are loaded into the operating system 910 on the memory 904 and/or the storage 920 and executed by the processor(s) 902. The storage 920 may store validation parameters (e.g., function proofs), function shares, function share results, reconstructed results, input data, and other data and be local to the computing device 900 or may be remote and communicatively connected to the computing device 900. In particular, in one implementation, components of a system for polynomial function secret sharing may be implemented entirely in hardware or in a combination of hardware circuitry and software.

The computing device 900 includes a power supply 916, which may include or be connected to one or more batteries or other power sources, and which provides power to other components of the computing device 900. The power supply 916 may also be connected to an external power source that overrides or recharges the built-in batteries or other power sources.

The computing device 900 may include one or more communication transceivers 930, which may be connected to one or more antenna(s) 932 to provide network connectivity (e.g., mobile phone network, Wi-Fi®, Bluetooth®) to one or more other servers, client devices, IoT devices, and other computing and communications devices. The computing device 900 may further include a communications interface 936 (such as a network adapter or an I/O port, which are types of communication devices). The computing device 900 may use the adapter and any other types of communication devices for establishing connections over a wide-area network (WAN) or local-area network (LAN). It should be appreciated that the network connections shown are exemplary and that other communications devices and means for establishing a communications link between the computing device 900 and other devices may be used.

The computing device 900 may include one or more input devices 934 such that a user may enter commands and information (e.g., a keyboard, trackpad, or mouse). These and other input devices may be coupled to the server by one or more interfaces 938, such as a serial port interface, parallel port, or universal serial bus (USB). The computing device 900 may further include a display 922, such as a touchscreen display.

The computing device 900 may include a variety of tangible processor-readable storage media and intangible processor-readable communication signals. Tangible processor-readable storage embodies by any available non-transitory media that can be accessed by the computing device 900 and can include both volatile and nonvolatile storage media and removable and non-removable storage media. Tangible processor-readable storage media excludes intangible and transitory communications signals (such as signals per se) and includes volatile and nonvolatile, removable and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 900. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A computing-processor-implemented method for polynomial function secret sharing by a dealer, wherein a polynomial function of a function client is shared by the dealer and is verifiable by multiple share parties and the function client generates a signed concatenation of first validation parameters, the computing-processor-implemented method comprising:

receiving, by the dealer, a first addend function and a second addend function, wherein a sum of the first addend function and the second addend function equals the polynomial function and each first validation parameter corresponds to a coefficient of the first addend function and a corresponding coefficient of the second addend function;

generating, by the dealer, a function share for each share party based on a sampling of first random polynomials and second random polynomials;

generating, by the dealer, second validation parameters for each share party based on the function shares, each second validation parameter for each share party corresponding to a coefficient of the first random polynomials or the second random polynomials;

transmitting, by the dealer, the second validation parameters to the share parties; and transmitting, by the dealer, each function share to a corresponding share party, wherein each function share is verifiable by the corresponding share party as being a share of the polynomial function received by the dealer from the function client, verification being based on the second validation parameters and the signed concatenation of the first validation parameters.

2. The computing-processor-implemented method of claim 1, wherein a constant term in each of the first random polynomials equals a coefficient of the first addend function and a constant term in each of the second random polynomials equals a coefficient of the second addend function.

3. The computing-processor-implemented method of claim 1, wherein each function share includes evaluations of the first random polynomials and the second random polynomials corresponding to a corresponding one of the share parties.

4. The computing-processor-implemented method of claim 1, wherein each first validation parameter includes a first randomly generated base having an exponent equaling a coefficient of the first addend function and a second randomly generated base element having an exponent equaling a corresponding coefficient of the second addend function.

5. The computing-processor-implemented method of claim 4, wherein each second validation parameter includes the first randomly generated base having an exponent equaling a coefficient of the first random polynomials and a second randomly generated base element having an exponent equaling the corresponding coefficient of the second random polynomials.

6. The computing-processor-implemented method of claim 1, wherein a share party is configured to verify its function share based on the first validation parameters and the second validation parameters.

7. The computing-processor-implemented method of claim 1, wherein a reconstructor is configured to verify function share results generated by share parties based on the second validation parameters.

8. A computing system for polynomial function secret sharing by a dealer, wherein a polynomial function of a function client is shared by the dealer and is verifiable by multiple share parties and the function client generates a signed concatenation of first validation parameters, the computing system comprising:

one or more hardware processors;

a communication interface executable by the one or more hardware processors and configured to receive a first addend function and a second addend function, wherein a sum of the first addend function and the second addend function equals the polynomial function and each first validation parameter corresponds to a coefficient of the first addend function and a corresponding coefficient of the second addend function;

a function share generator executable by the one or more hardware processors and configured to generate a function share for each share party based on a sampling of first random polynomials and second random polynomials; and a validation parameter generator executable by the one or more hardware processors and configured to generate second validation parameters for each share party based on the function shares, each second validation parameter for each share party corresponding to a coefficient of the first random polynomials or the second random polynomials, wherein the communication interface is further configured to transmit the second validation parameters to the share parties and to transmit each function share to a corresponding share party, wherein each function share is verifiable by the corresponding share party as being a share of the polynomial function received by the dealer from the function client, verification being based on the second validation parameters and the signed concatenation of the first validation parameters.

9. The computing system of claim 8, wherein a constant term in each of the first random polynomials equals a coefficient of the first addend function and a constant term in each of the second random polynomials equals a coefficient of the second addend function.

10. The computing system of claim 8, wherein each function share includes evaluations of the first random polynomials and the second random polynomials corresponding to a corresponding one of the share parties.

11. The computing system of claim 8, wherein each first validation parameter includes a first randomly generated base element raised to an exponent equaling a coefficient of the first addend function and a second randomly generated base element raised to an exponent equaling a corresponding coefficient of the second addend function.

12. The computing system of claim 11, wherein each second validation parameter includes the first randomly generated base element raised to an exponent equaling a coefficient of the first random polynomials and a second randomly generated base element raised to an exponent equaling the corresponding coefficient of the second random polynomials.

13. The computing system of claim 8, wherein a share party is configured to verify its function share based on the first validation parameters and the second validation parameters.

14. The computing system of claim 8, wherein a reconstructor is configured to verify function share results generated by share parties based on the second validation parameters.

15. One or more tangible processor-readable storage media embodied with instructions for executing on one or more processors and circuits of a computing device a process for polynomial function secret sharing by a dealer, wherein a polynomial function of a function client is shared by the dealer and is verifiable by multiple share parties and the function client generates a signed concatenation of first validation parameters, the process comprising:

receiving, by the dealer, a first addend function and a second addend function, wherein a sum of the first addend function and the second addend function equals the polynomial function and each first validation parameter corresponds to a coefficient of the first addend function and a corresponding coefficient of the second addend function;

generating, by the dealer, a function share for each share party based on a sampling of first random polynomials and second random polynomials;

generating, by the dealer, second validation parameters for each share party based on the function shares, each second validation parameter for each share party corresponding to a coefficient of the first random polynomials or the second random polynomials;

transmitting, by the dealer, the second validation parameters to the share parties; and transmitting, by the dealer, each function share to a corresponding share party, wherein each function share is verifiable by the corresponding share party as being a share of the polynomial function received by the dealer from the function client, verification being based on the second validation parameters and the signed concatenation of the first validation parameters.

16. The one or more tangible processor-readable storage media of claim 15, wherein a constant term in each of the first random polynomials equals a coefficient of the first addend function and a constant term in each of the second random polynomials equals a coefficient of the second addend function.

17. The one or more tangible processor-readable storage media of claim 15, wherein each function share includes evaluations of the first random polynomials and the second random polynomials corresponding to a corresponding one of the share parties.

18. The one or more tangible processor-readable storage media of claim 15, wherein each first validation parameter includes a first randomly generated base element raised to an exponent equaling a coefficient of the first addend function and a second randomly generated base element raised to an exponent equaling a corresponding coefficient of the second addend function, and each second validation parameter includes the first randomly generated base element raised to an exponent equaling a coefficient of the first random polynomials and a second randomly generated base element raised to an exponent equaling the corresponding coefficient of the second random polynomials.

19. The one or more tangible processor-readable storage media of claim 15, wherein a share party is configured to verify its function share based on the first validation parameters and the second validation parameters.

20. The one or more tangible processor-readable storage media of claim 15, wherein a reconstructor is configured to verify function share results generated by share parties based on the second validation parameters.

* * * * *